(12) United States Patent
Fukuhara et al.

(10) Patent No.: US 7,298,915 B2
(45) Date of Patent: Nov. 20, 2007

(54) IMAGE ENCODING APPARATUS AND METHOD

(75) Inventors: Takahiro Fukuhara, Kanagawa (JP); Seiji Kimura, Chiba (JP)

(73) Assignee: Sony Corporation, Tokyo (JP)

( * ) Notice: Subject to any disclaimer, the term of this patent is extended or adjusted under 35 U.S.C. 154(b) by 736 days.

(21) Appl. No.: 10/835,766

(22) Filed: Apr. 30, 2004

(65) Prior Publication Data

US 2005/0002574 A1    Jan. 6, 2005

(30) Foreign Application Priority Data

May 2, 2003    (JP) .............................. 2003-127409

(51) Int. Cl.
*G06K 9/36* (2006.01)
*G06K 9/46* (2006.01)
(52) U.S. Cl. ...................................... 382/248; 382/251
(58) Field of Classification Search ................ 382/240, 382/247, 251; 358/426.14; 375/240.11, 375/240.19; 348/398.1
See application file for complete search history.

(56) References Cited

U.S. PATENT DOCUMENTS 6,157,746 A * 12/2000 Sodagar et al. ............. 382/240
6,549,674 B1 * 4/2003 Chui et al. .................. 382/240

\* cited by examiner

*Primary Examiner*—Phuoc Tran
(74) *Attorney, Agent, or Firm*—Finnegan, Henderson, Farabow, Garrett & Dunner, L.L.P.

(57) ABSTRACT

In an image encoder (1), a quantizer (11) makes a quantization-step size set for each of low-frequency subbands whose resolution level belongs to a predetermined resolution level coincide with a quantization-step size set for each subband to encode an original image having the resolution level as it is. A low-pass rate controller (17) provides a rate control for the bit rate of arithmetic code D16 in all code blocks in a low-frequency subband to be less than a predetermined target bit rate. A high-pass rate controller (18) provides such a rate control that the bit rate of arithmetic code D17 in all code blocks in other subbands than the low-frequency subbands will be less than a target bit rate, that is, a bit rate resulted from subtraction of a bit rate D18 having actually occurred in the low-frequency subbands from a final target bit rate.

12 Claims, 14 Drawing Sheets

IMAGE ENCODING APPARATUS AND METHOD

BACKGROUND OF THE INVENTION

1. Field of the Invention

The present invention generally relates to an image encoding apparatus and method, for compressing an input image according to the JPEG-2000 Standard, for example.

This application claims the priority of the Japanese Patent Application No. 2003-127409 filed on May 2, 2003, the entirety of which is incorporated by reference herein.

2. Description of the Related Art

One of the typical techniques of image compression is defined in the JPEG (Joint Photographic Experts Group) standardized by the ISO (International Standards Organization). The JPEG uses the DCT (discrete cosine transform) to provide quality encoded images and decoded images in case a relatively high bit rate is assigned for the encoding. However, if the bit rate for encoding is smaller than necessary, the block distortion peculiar to the DCT will be remarkable and a resultant image will appear noticeably degraded in quality.

On the other hand, many researches have recently been done of the techniques of dividing an image into a plurality of frequency bands by a so-called filter bank including a high-pass filter and low-pass filter in combination and encoding each of the frequency bands. Of such techniques, the wavelet-transform coding is considered as a new promising technique which will take the place of the DCT (discrete cosine transform) because even a high compression results in no considerable block distortion as in the DCT.

For example, the JPEG-2000 Standard established as an international standard in January, 2001 adopts a combination of the wavelet transform and a high-efficiency entropy coding (bit modeling and arithmetic coding, both in bit planes), and has attained a greater improvement in efficiency of coding than the conventional JPEG (cf. Japanese Published Unexamined Patent Application No. 2002-165098).

These international standards defines only the design requirement for the decoder, not any for the encoder. Therefore, the encoder can freely be designed. On the other hand, since there exists no standard for any effective rate-control means to attain a target compression ratio, so it is most important to establish a technical know-how for attaining a target compression ratio.

In encoding an image whose resolution is 2000×1000 for example in the encoder defined in the JPEG-2000, however, it is common to control the bit rate for a minimum distortion of the entire image. On the other hand, in similar coding of n image whose resolution of 1000×500, which is a square of the above-mentioned resolution, the bit rate is also controlled for a minimum distortion of the entire image. This is a rate control based on the RD (rate-distortion) characteristic. Such rate control is versatile but disadvantageous in that the load of calculation is very great. Also, the technique of controlling a bit rate for a minimum numerical distortion is disadvantageous in that it cannot assure a highest quality of an image when viewed by the human being.

Further, for compressing an image of 2000×1000 for example to a size of 1000 kilobytes as an application of the bit-rate control, and image of 1000×500 as a low-frequency component of 2000×1000 in resolution can be compressed simultaneously to a size of 500 kilobytes using the feature of the wavelet transform. However, the image resulted from compression of an image as the low-frequency component of 1000×500 to 500 kilobytes is normally lower in quality than an image resulted from compression, to 500 kilobytes, of an original image whose resolution is 1000×500.

OBJECT AND SUMMARY OF THE INVENTION

It is therefore an object of the present invention to overcome the above-mentioned drawbacks of the related art by providing an image encoding apparatus and method, capable of controlling the quality of an image resulted from compression of an image having a predetermined resolution (corresponding to the aforementioned image whose resolution is 1000×500) and that is a part of an original image (corresponding to the image whose resolution is 2000×1000) and maintaining the quality of the image resulted from compression of the original image at a high level.

The above object can be attained by providing an image encoding apparatus and method, in which an input image is filtered to generate a plurality of subbands different in resolution level, the coefficient of each of the subbands resulted from the filtering of the input image is quantized by dividing it by a quantization-step size set for each of the subbands, the subband is divided to generate a code block having a predetermined size, a bit plane including bits from an MSB to an LSB is generated for each of the code blocks, a coding pass generated for each of the bit planes is arithmetically encoded, a packet being formed from the arithmetic code to generate an encoded stream of codes, the quantization-step size set, during the quantization, for the subband whose resolution level belongs to the predetermined resolution is made to coincide with the quantization-step size set for each subband to quantize the predetermined resolution level as a resolution level of an original image.

In the above image encoding apparatus and method, the quantization-step size set, during the quantization, for the subband whose resolution level belongs to the predetermined resolution is made to coincide with the quantization-step size set for each subband to quantize the predetermined resolution level as that of an original image. Thus, by controlling the quality of a compressed image of a subband whose resolution level belongs to the predetermined resolution level to approximate that of a compressed image resulted from compression of an image having initially the resolution level, it is possible to maintain the quality of a compressed image resulted from compression of an original image at a high level.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 3 shows subbands resulted from wavelet transform of an actual image, in which

FIG. 4 shows a quantization-step size Q assigned to each band in the conventional image encoder, in which

FIG. 5 shows a quantization-step size Q assigned to each band in the embodiment of the present invention, in which

FIG. 7 explains a bit plane, in which

DETAILED DESCRIPTION OF THE PREFERRED EMBODIMENTS

The present invention will be described in detail below concerning an embodiment thereof with reference to the accompanying drawings.

Figure 1:
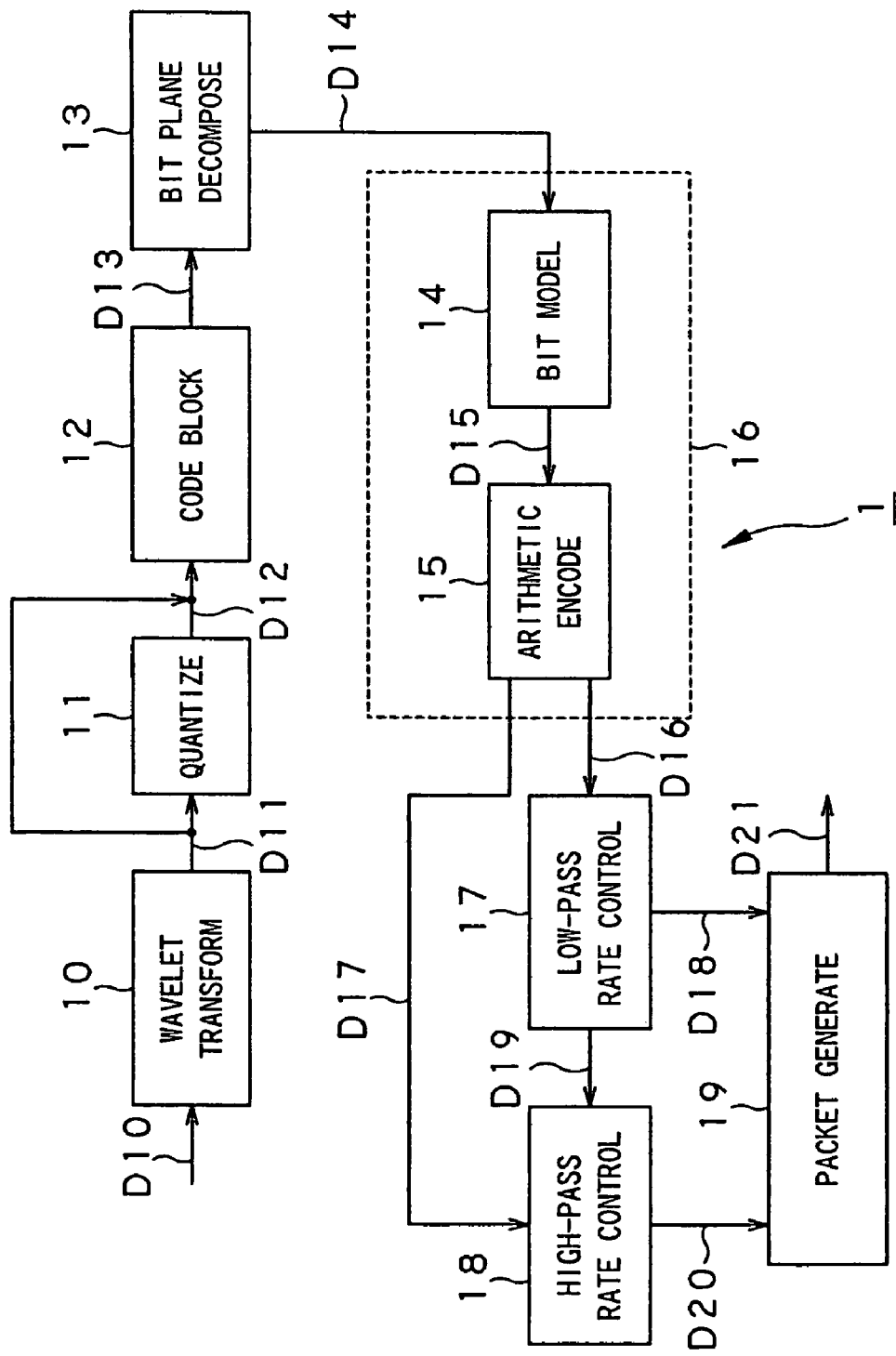
FIG. 1 is a schematic block diagram of an image encoder as an embodiment of the present invention.

Referring now to FIG. 1, there is schematically illustrated in the form of a block diagram an image encoder according to an embodiment of the present invention. As shown in FIG. 1, the image encoder, generally indicated with a reference 1, includes a wavelet transformer 10, quantizer 11, code blocking unit 12, bit plane decomposer 13, bit modeling unit 14, arithmetic encoder 15, low-pass rate controller 17, high-pass rate controller 18, and a packet generator 19. The bit modeling unit 14 and arithmetic encoder 15 form together an EBCOT (embedded coding with optimized truncation) unit 16.

The wavelet transformer 10 is normally a filter bank including a low-pass filter and a high-pass filter. It should be noted that a digital filter has to be pre-buffered with a sufficient amount of input images for filtering since it normally shows an impulse response (filter factor) for a plurality of tap lengths. However, no digital filter is illustrated in FIG. 1 because its configuration is simple.

The wavelet transformer 10 is supplied with a minimum necessary amount of cross-faded image D10 for filtering, and filters it for wavelet transform to generate a wavelet transform coefficient D11.

Figure 2:
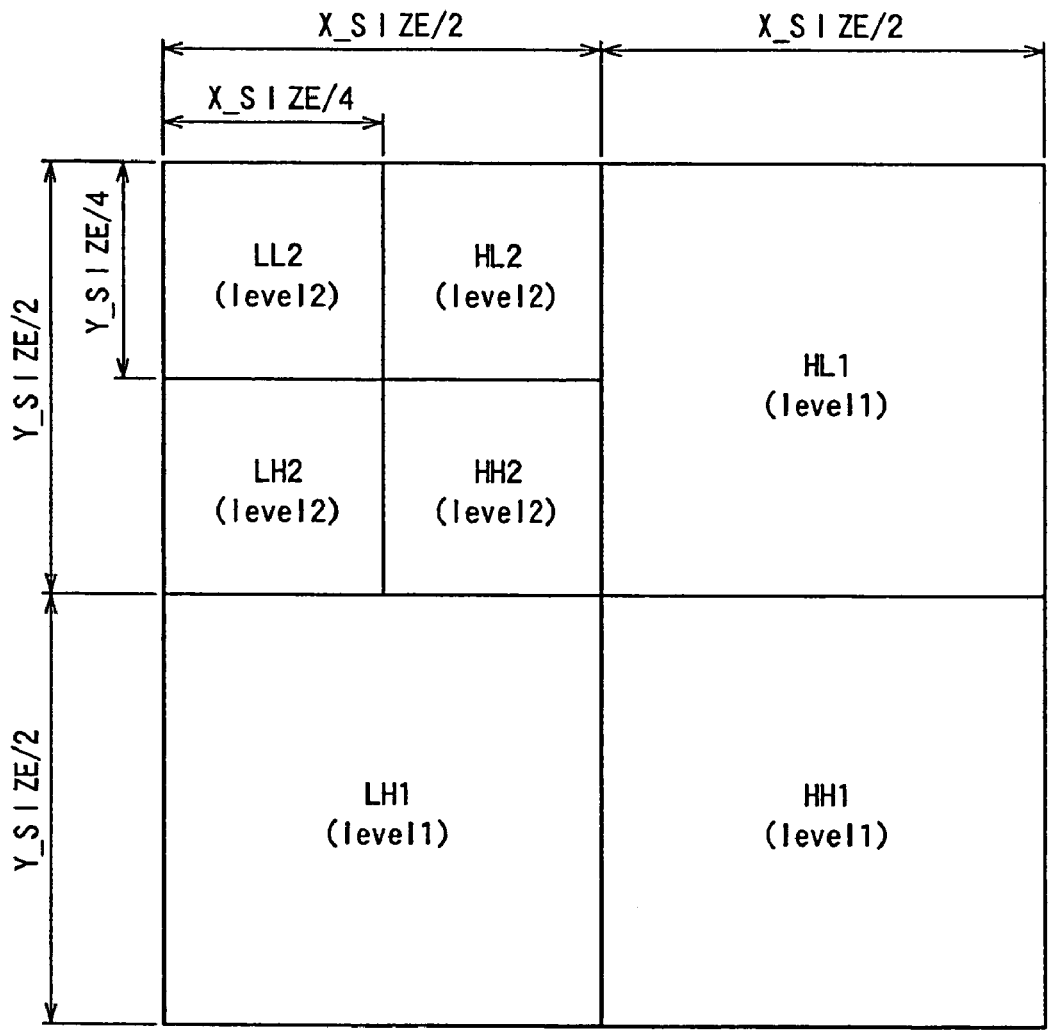
FIG. 2 explains subbands wavelet-transformed down to a second level.
Figure 3B:
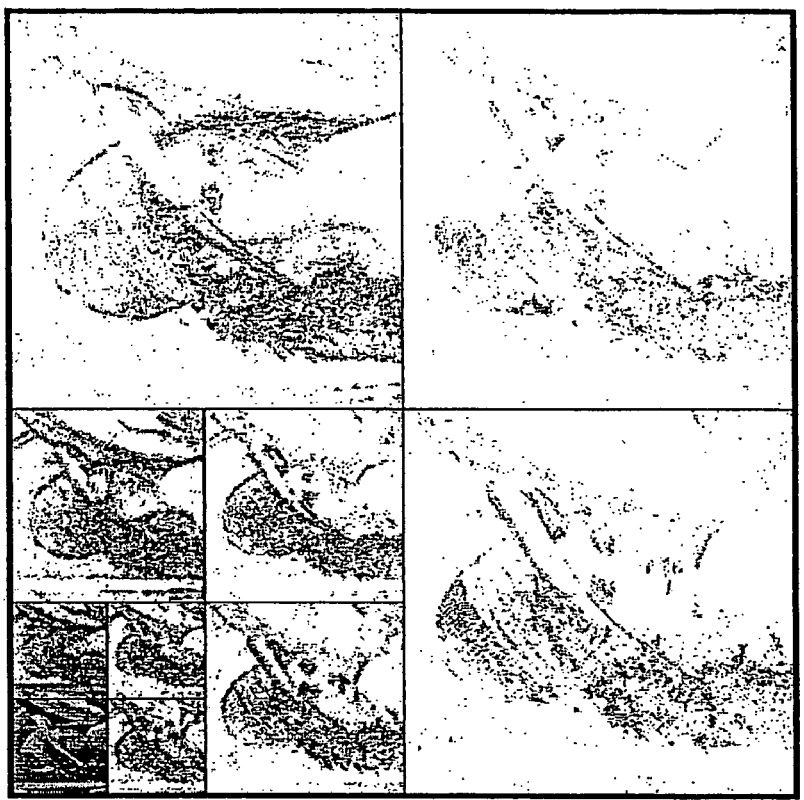
FIG. 3A shows an example of wavelet transform made down to a first level and FIG. 3B shows an example of wavelet transform made down to a third level.
Figure 3A:
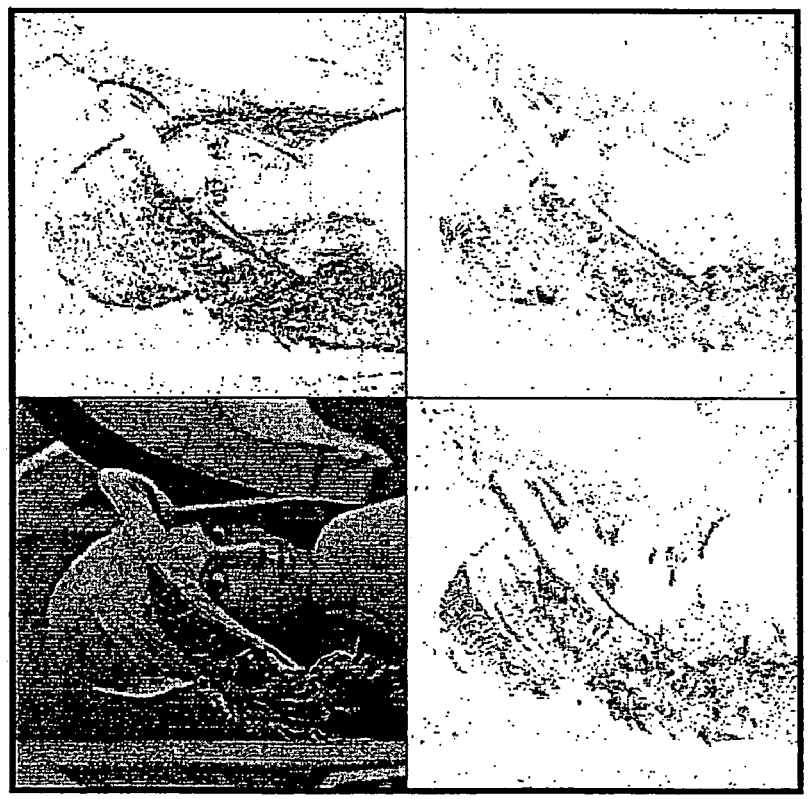

In the above wavelet transform, a low-frequency component is normally transformed repeatedly as shown in FIG. 2 because the majority of the image energy is concentrated to the low-frequency component, which will also be seen from the fact that as the division level is shifted from the division level of 1 (one) as in FIG. 3A to the division level of 3 (three) as in FIG. 3B, subbands will be formed as in FIG. 3. That is, the level number of the wavelet transform in FIG. 2 is 2 (two), and thus a total of seven subbands is generated. More specifically, the horizontal size X_SIZE and vertical size Y_SIZE are halved by a first filtering to provide four subbands LL2, LH2, HL2 and HH2. The subband LL1 is quartered by a second filtering to provide four subbands LL1, LH1, HL1 and HH1. It should be noted that in FIG. 2, "L" and "H" indicate a low-frequency band and high-frequency band, respectively, and numbers suffixed to "L" and "H", respectively, indicate numbers of wavelet-transform divisions, respectively. That is, "LH1", for example, indicates a subband having a wavelet-transform division level of 1 (one) in which a low-frequency band extends horizontally while a high-frequency band extends vertically.

The quantizer 11 makes irreversible compression of the wavelet transform coefficient D1 supplied from the wavelet transformer 10. Normally, the quantizer 11 adopts a scalar quantization to divide the wavelet transform coefficient D11 by a quantization-step size. It should be noted here that the JPEG-2000 Standard prescribes that in case an irreversible 9×7 wavelet-transform filter is used for the above-mentioned irreversible compression, the scalar quantization shall automatically be used in combination. On the other hand, in case a reversible 5×3 wavelet-transform filter is used, no quantization is done but the bit rate is controlled by the low-pass rate controller 17 and high-pass rate controller 18 provided downstream. Therefore, the quantizer 11 in FIG. 1 actually operates only when the irreversible 9×7 wavelet-transform filter is used. The embodiment of the present invention will further be described below on the assumption that the irreversible 9×7 wavelet-transform filter is used.

Note here that ones of the subbands generated via the wavelet transform, of which the number of wavelet-transform divisions is larger, that is, of which the resolution level is lower, will have a larger influence on the image quality, while ones of the subbands, of which the number of wavelet-transform divisions is smaller, namely, of which the resolution level is higher, will have a smaller influence on the image quality. Therefore, this fact can be utilized to encode an image by making a finer quantization of the wavelet transform coefficient with the quantization-step size being set smaller in the low-frequency band while making a coarser quantization with the quantization-step size being set larger in the high-frequency band. Thus, it is possible to encode an image on the basis of the human visual characteristic.

FIG. 4 shows a relation between the number of wavelet-transform divisions and quantization-step size Q for each subband by way of example. These factors can be related with each other as given by the following formula (1):

$$Q_{LL5} < Q_{HL5} = Q_{LH5} < Q_{HH5} < Q_{HL4} = Q_{LH4} < Q_{HH4} < Q_{HL3} = Q_{LH3} < Q_{HH3} < Q_{HL2} = Q_{LH2} < Q_{HH2} < Q_{HL1} = Q_{LH1} < Q_{HH1} \qquad (1)$$

Figure 4B:
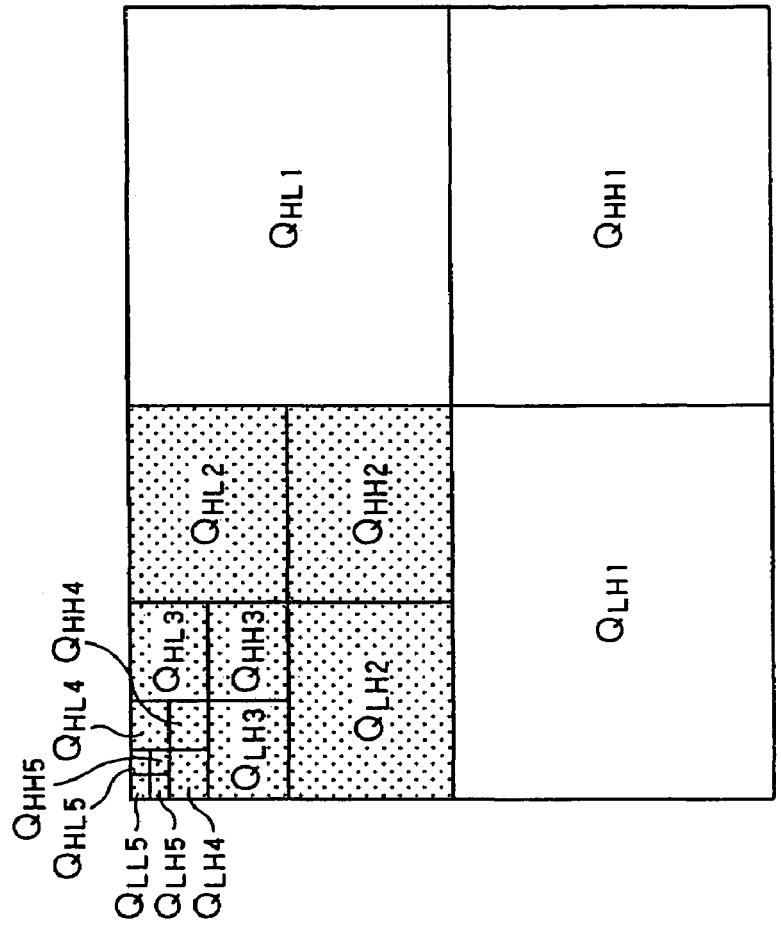
FIG. 4A shows an image example whose resolution is 1000×500 and FIG. 4B shows an image example whose resolution is 2000×1000.
Figure 4A:
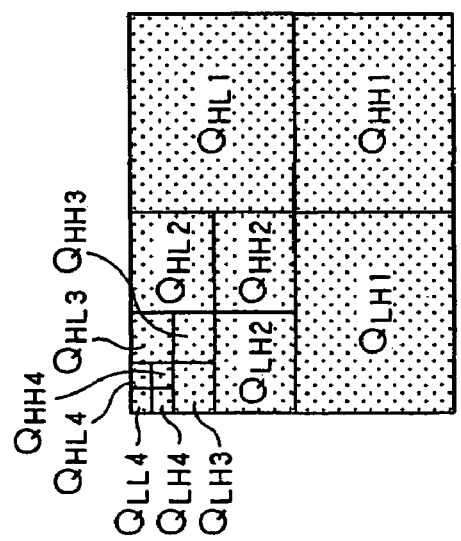

FIG. 4A shows a quantization-step size Q assigned to each subband in order to encode an image whose resolution is 1000×500, and FIG. 4B shows a quantization-step size Q assigned to each subband in order to encode an image whose resolution is 2000×1000.

FIG. 4A shows all the subbands (shown as smudged) generated via four times of wavelet transform of an original image of 1000×500 in resolution, while FIG. 4B shows ones (shown as smudged) of 1000×500 in resolution, of subbands generated via five times of wavelet transform of an original image of 2000×1000 in resolution. Namely, the subbands shown in FIG. 4A have been wavelet-transformed a number of times one smaller than the subbands in FIG. 4B and hence different in quantization-step size from the latter. That is, the image of 1000×500 in resolution shown in FIG. 4A is encoded as it is, while the low-frequency subbands of 1000×500 in resolution shown in FIG. 4B are assigned $Q_{HH2}$ in place of $Q_{HH1}$, for example.

In case an image of 1000×500, as a low-frequency component of an image of 2000×1000, is compressed to 500 kilobytes with the use of the feature of the wavelet transform technique when compressing the image of 2000×1000 to 1000 kilobytes, emphasis will be given to the quality of the high-frequency subbands because of its small quantization-step size since $Q_{HH2} < Q_{HH1}$ as will be known the formula (1). That is, the bit rate assigned to the low-frequency component will be reduced so that a visual distortion called "flicker noise" will be detected and thus the image of 1000×500 will be lower in quality than the original image of 1000×500.

Figure 5B:
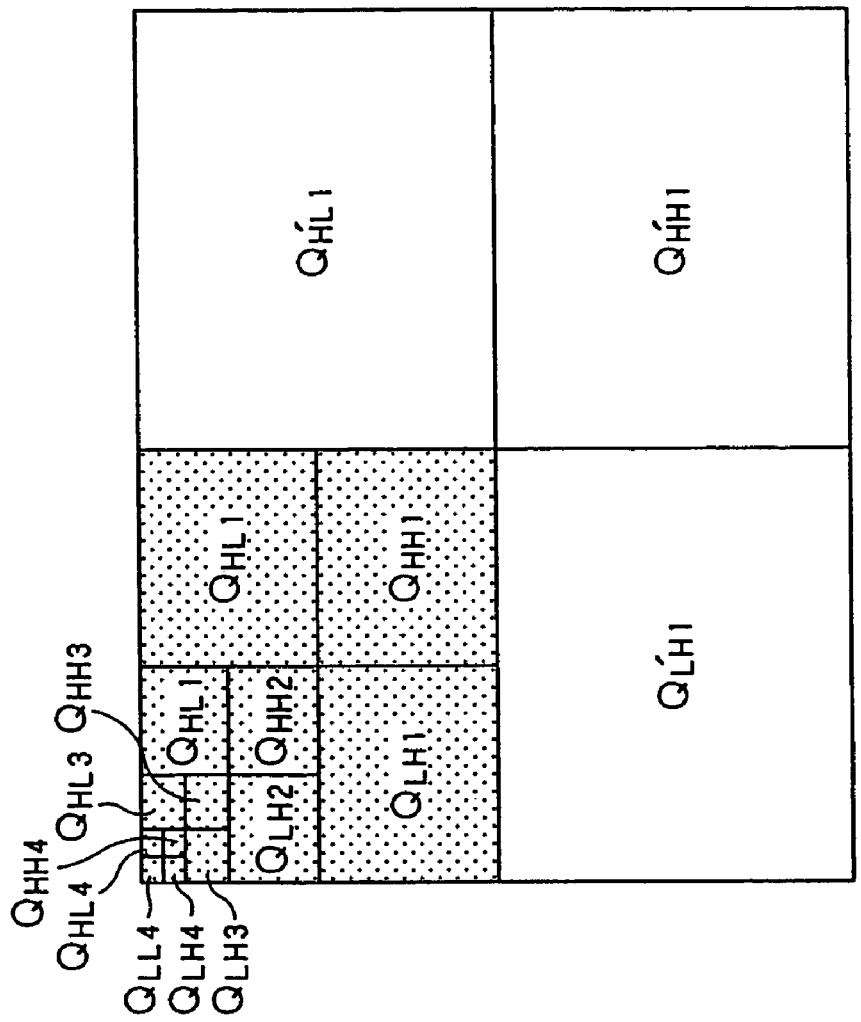
FIG. 5A shows an example of image whose resolution is 1000×500 and FIG. 5B shows an example of image whose resolution is 2000×1000.
Figure 5A:
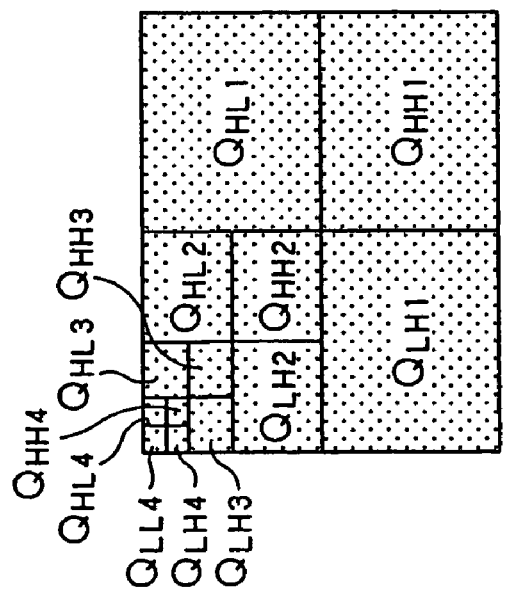

On this account, the quantizer 11 included in the embodiment of the present invention provides a quantization control to make the quantization-step size for low-frequency subbands whose resolution level belongs to the predetermined one, for example, for low-frequency subbands of 1000×500 of an original image of 2000×1000, coincide with that set for each subband to encode an original image of 1000×500, as shown in FIG. 5.

Figure 6:
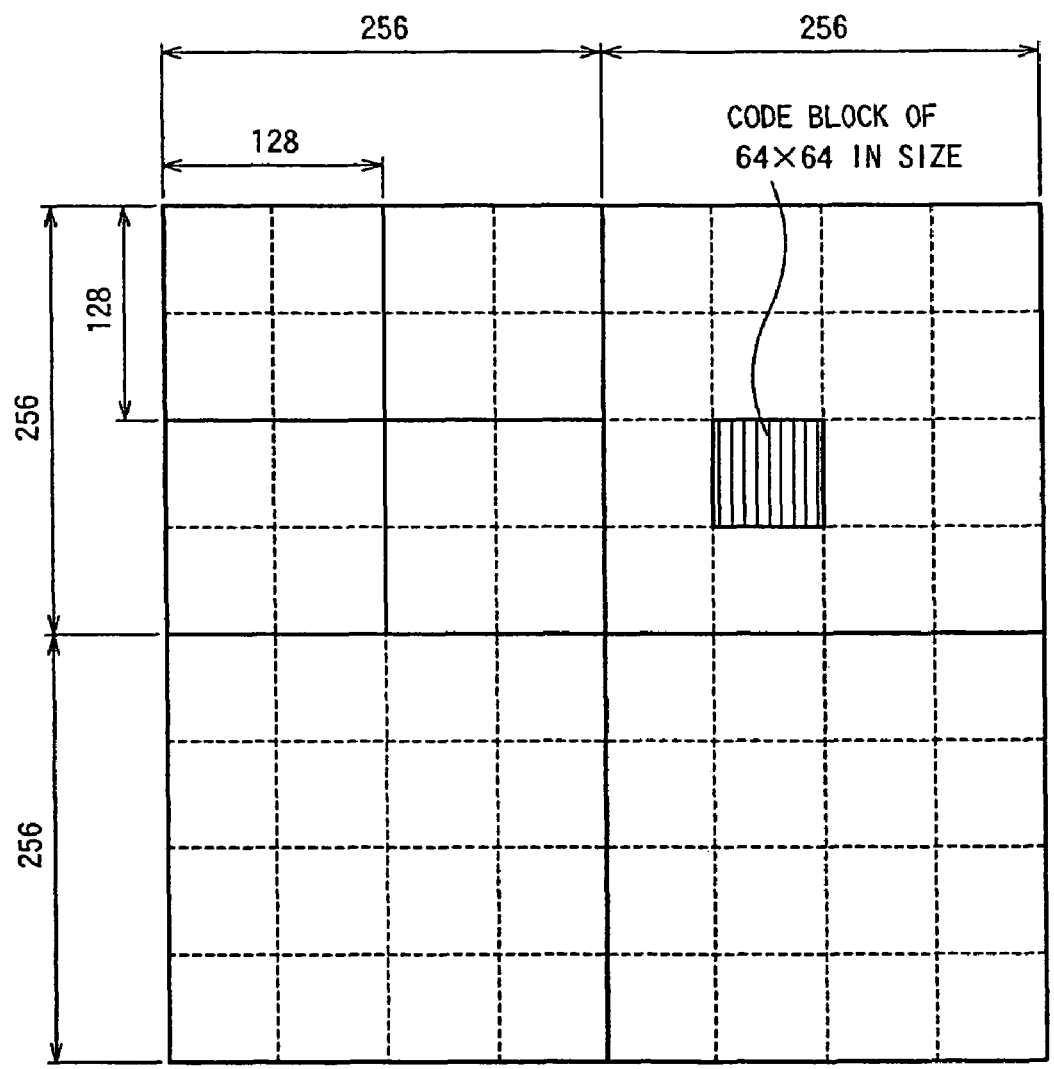
FIG. 6 shows the relation between code blocks and subbands.

The description will be made with reference to FIG. 1 again. The code blocking unit 12 divides the quantization coefficient D12 for each of the subbands generated by the quantizer 11 into code blocks that are defined as a unit of coding in the JPEG-2000 Standard. More specifically, as shown in FIG. 6, code blocks each having a size of about 64×64 for example are generated in each of the subbands after the division, and the encoding will be done of each of these code blocks in the downstream part of the image encoder 1. It should be noted that the code block size shall be represented by a power of 2 (two) in both horizontal and vertical directions as defined in the JPEG-2000 Standard and it is 32×32 or 64×64 in many cases. The code blocking unit 12 supplies the quantization coefficient D13 for each code block to the bit plane decomposer 13.

Figures 7A, 7B, 7C:
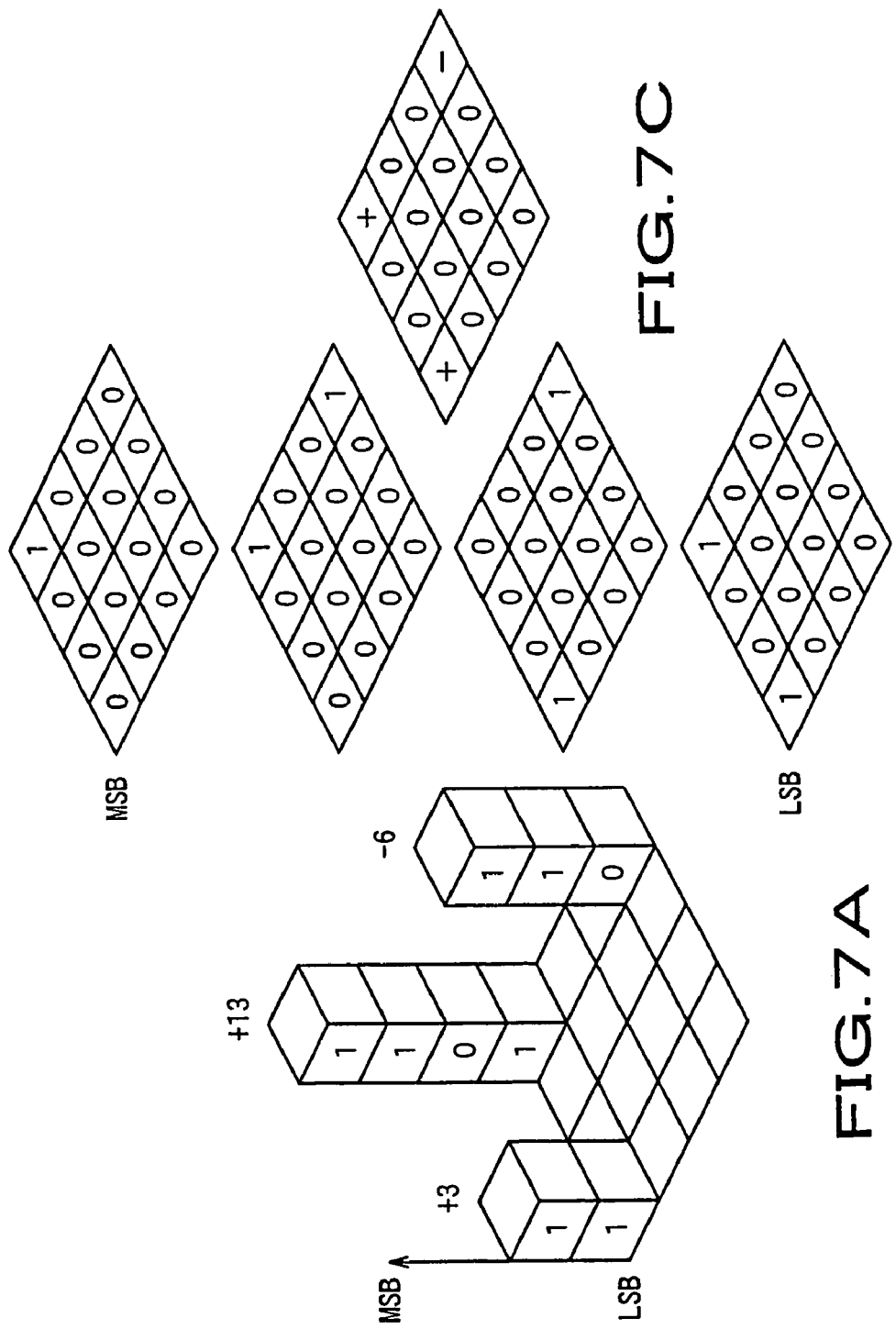
FIG. 7A shows a quantization coefficient including a total of 16 coefficients.
FIG. 7B shows a bit plane of the absolute values of the coefficient.
FIG. 7C shows a bit plane of codes.

The bit plane decomposer 13 expands the quantization coefficient D13 for each of the code blocks supplied from the code blocking unit 12 to a bit plane, and supplies the quantization coefficient D14 for each bit plane to the bit modeling unit 14. The concept of this bit plane will be described below with reference to FIG. 7. FIG. 7A shows an assumed quantization coefficient including a total of 16 coefficients (=4 vertical coefficients by 4 horizontal ones). The largest absolute-value one of these 16 quantization coefficients is 13 (thirteen) that is binary-notated as "1101". Therefore, the bit planes defined by the coefficient absolute-values include four as shown in FIG. 7B. It should be noted that all elements of each bit plane take a number 0 (zero) or 1 (one). On the other hand, the only one of the quantization coefficients which has a negative sign is "−6", while all the other quantization coefficients are 0 (zero) and positive-signed ones. Therefore, the bit plane of signs is as shown in FIG. 7C.

The bit modeling unit 14 makes bit modeling of the quantization coefficient D14 for each bit plane as will be described below, and supplies a context D15 to the arithmetic encoder 15. It should be noted here that according to this embodiment, there is used an entropy coding called "EBCOT" defined in the JPEG-2000 Standard. The EBCOT is such that an entropy coding is done while measuring a statistic amount of the quantization coefficients in each code block. It should be noted that the EBCOT (embedded coding with optimized truncation) is described in detail in the document "ISO/IEC 15444-1, Information Technology—JPEG 2000, Part 1: Core Coding System" and the like.

Each of the code blocks is encoded bit plane by bit plane independently in a direction from the most significant bit (MSB) to least significant bit (LSB). A quantization coefficient is expressed by a signed binary number of n bits, and bits 0 to (n−2) represent the bits, respectively, included between LSB and MSB. It should be noted that the remaining one bit is a sign. The code blocks are sequentially encoded starting with the MSB-side bit plane via three types of coding passes as shown below:

(a) Significant propagation pass (also called SP pass)
(b) Magnitude refinement pass (also called MR pass)
(c) Clean-up pass (also called CU pass)

Figure 8:
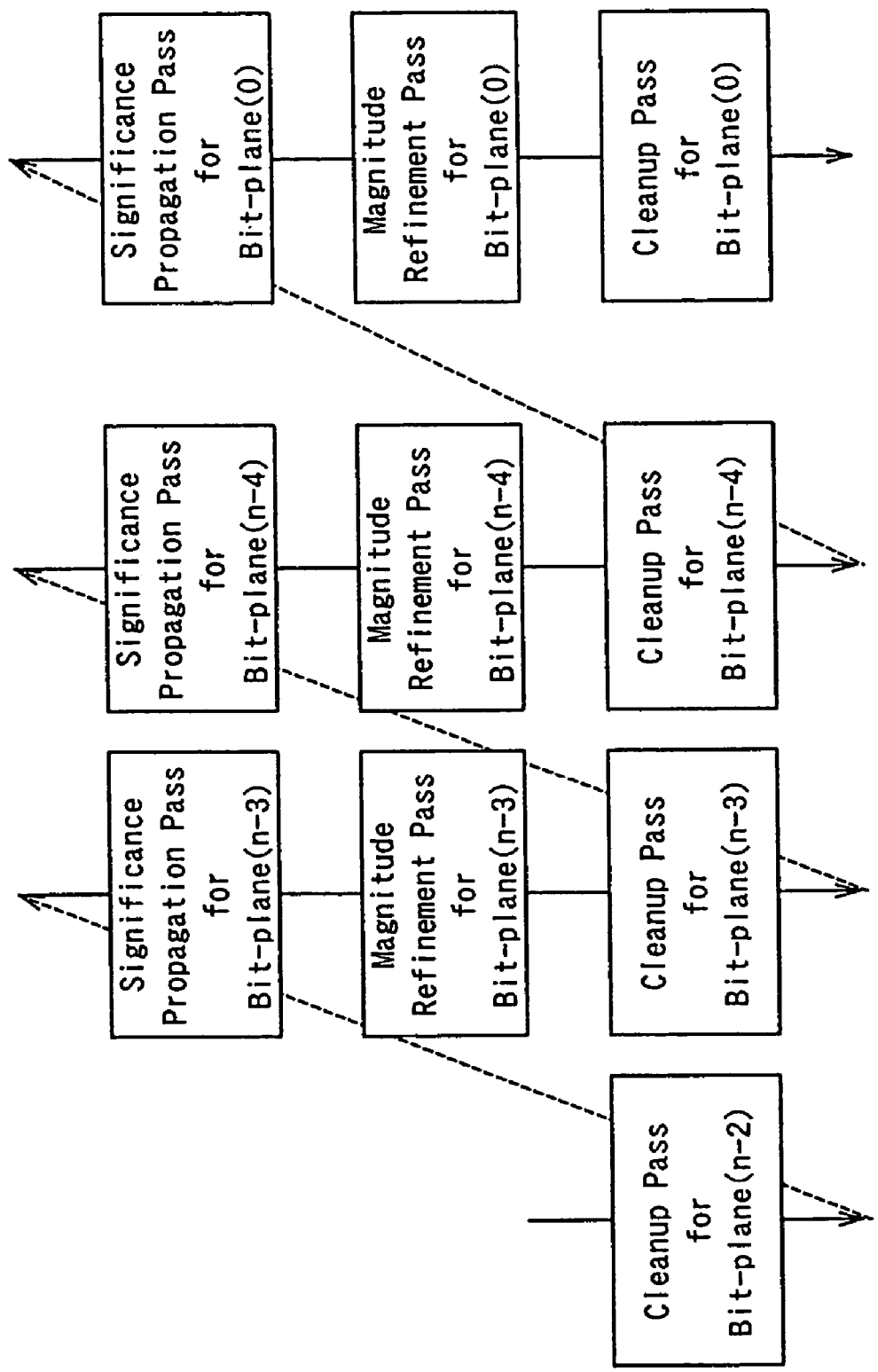
FIG. 8 explains a procedure of processing via a coding pass in the code block.

The three types of coding passes are used in a sequence as shown in FIG. 8. As shown in FIG. 8, a bit plane (n−2) at the MSB side is first encoded via the CU pass. Next, bit planes are sequentially encoded toward the LSB side. The bit planes are encoded via the SP pass, MR pass and CU pass in this order.

Actually, however, it is written in a header in which bit plane counted from the MSB "1" will appear, and all-zero bit planes will not be encoded. The three types of coding passes are repeatedly used in this order to encode the bit planes, and the encoding is ceased after an arbitrary bit plane is encoded via an arbitrary one of the coding passes. Thereby, a tradeoff can be made between the bit rate and image quality, namely, the bit rate can be controlled.

Figure 9:
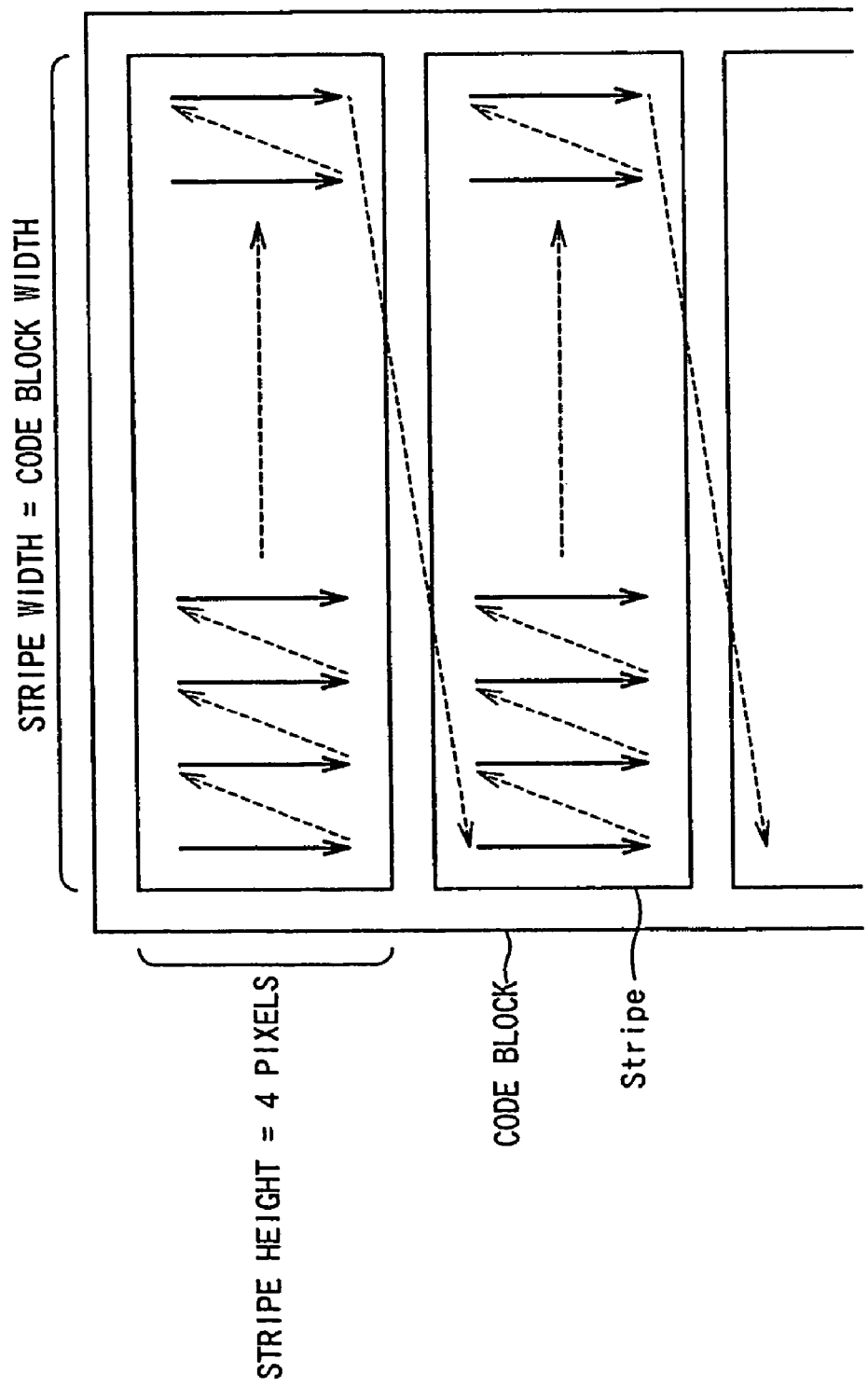
FIG. 9 explains a procedure of scanning the coefficients in the code block.

The coefficients are scanned as will be described below with reference to FIG. 9. The code blocks are grouped at each height of four coefficients into a stripe. The stripe is as wide as the width of the code block. The "scanning sequence" means a sequence in which all coefficients in one code block are scanned. In a code block, the coefficients are scanned in a sequence from the upper to lower stripe. In each stripe, the coefficients are scanned in a sequence from the left to right row. In each of the rows, the coefficients are scanned in a sequence from the top to bottom. It should be noted that in each coding pass, all the coefficients in a code block are scanned in these sequences of scanning.

The above three types of coding passes will be described below:

(a) Significance propagation pass (SP pass)

The SP pass via which a bit plane is encoded is intended to arithmetically encode the value of a bit plane of non-significant coefficients of which at least one near "eight" is significant. In case the bit plane thus encoded has a value of 1 (one), whether the sign of the code is positive or negative is arithmetically encoded.

The "significance" referred to herein indicates a state the encoder has for each coefficient. The initial value of the "significance" is 0 (zero) indicating that the bit plane is non-significant. When the coefficient of the bit plane, which is 1 (one), is encoded, the initial value changes to 1 (one) which indicates that the encoder state is significant, and then will always be 1 (one). Therefore, the "significance" can be said to be a flag indicative of whether valid-digit information has already been encoded.

(b) Magnitude refinement pass (MR pass)

The MR pass via which a bit plane is encoded is intended to arithmetically encode the value of a bit plane of significant coefficients, not encoded via the SP pass via which a bit plane is to be encoded.

(c) Clean-up pass (CU pass)

The CU pass via which a bit plane is encoded is intended to arithmetically encode the value of a bit plane of nonsignificant coefficients, not encoded by the SP pass via which a bit plane is to be encoded. In case the bit plane thus encoded has a value of 1 (one), it is continuously encoded arithmetically whether the sign of the code is positive or negative.

Note that in the arithmetic coding made via the above three types of coding passes, any of ZC (zero coding), RLC (run-length coding), SC (side coding) and MR (magnitude refinement) is selectively used to select a context of the coefficients. Then, a context selected via an arithmetic coding called "MQ coding" is encoded. The "MQ coding" is a learning type binary arithmetic coding defined in the JBIG2. The "MQ coding" is described in the document "ISO/IEC FDIS 14492, "Lossy/Lossless Coding of Bi-level Images", March 2000". In the JPEG-2000 Standard, a total of 19 types of contexts is defined for all the coding passes.

The bit modeling unit 14 decomposes the quantization coefficient D14 for each bit plane into three coding passes to generate a coefficient context D15 for each coding pass. The arithmetic encoder 15 makes arithmetic coding of the context D15, supplies arithmetic code D16 in a predetermined low-frequency subband having the quantization-step size thereof changed by the quantizer 11 to the low-pass controller 17, and also arithmetic code D17 in other high-frequency subbands to the high-pass rate controller 18.

Figure 10:
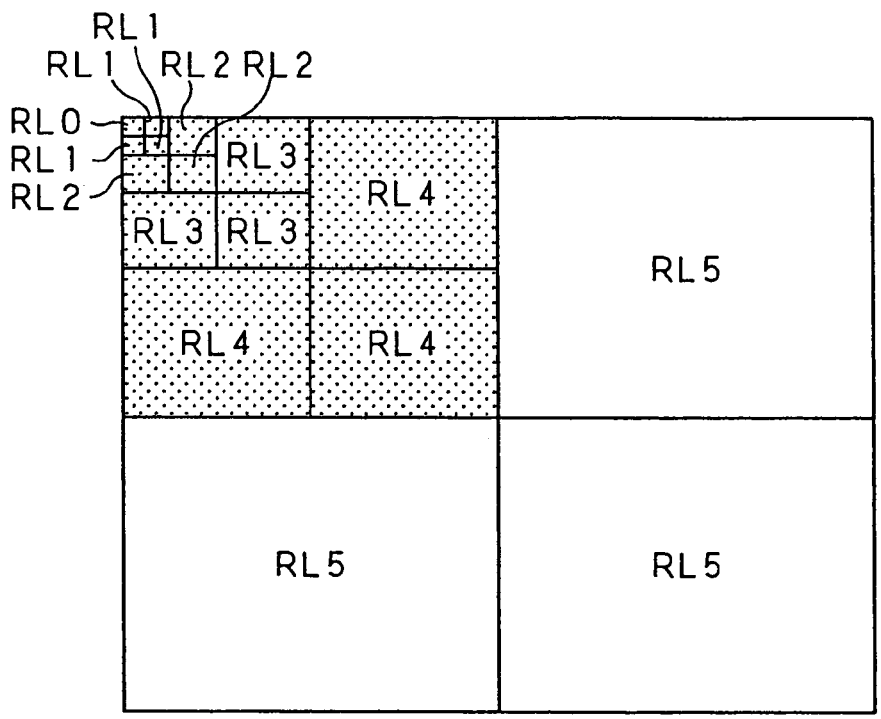
FIG. 10 shows examples of subbands processed in low- and high-pass rate controllers in the image encoder as the embodiment of the present invention.

The low-pass rate controller 17 processes at least a part of the coding passes, then adds together the bit rates of the arithmetic codes D16 supplied from the arithmetic encoder 15, that is, the bit rates of the arithmetic codes D16 in all the code blocks existent in low-frequency subbands (RL0 to RL4) whose resolution levels (RL) are 0 to 4, respectively, as shown in FIG. 10, in a predetermined sequence which will be described in detail later, and truncates the arithmetic codes D16 appearing after a predetermined target bit rate has been reached. By truncating the arithmetic codes D16 just before the predetermined target bit rate has been reached as above, the bit rate can positively be set to less than a target bit rate. The low-pass rate controller 17 supplies arithmetic code D18 having the bit rate thereof controlled to the packet generator 19, and a bit rate D19 to the high-pass rate controller 18.

The high-pass rate controller 18 adds together the bit rates of the arithmetic codes D17 supplied from the arithmetic encoder 15, that is, the bit rates of the arithmetic codes D17 in each of the code blocks existent in a high-frequency subband (RL5) whose resolution level is 5 (five), as shown in FIG. 10, and controls the bit rate to less than the target one. The high-pass rate controller 18 supplies arithmetic code D20 having the bit rate thereof controlled to the packet generator 19. It should be noted the target bit rate in the high-pass rate controller 18 is a result of subtraction of the bit rate D18 in the low-frequency subbands from the target bit rate in all the final subbands.

Figure 11:
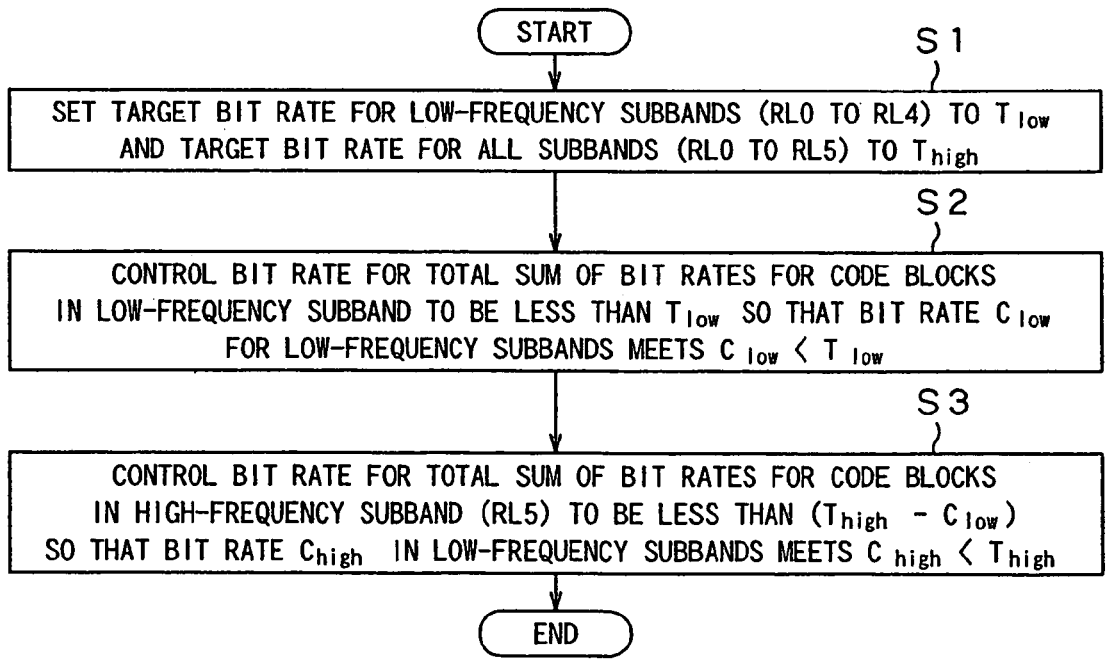
FIG. 11 shows a flow of operations of the low- and high-pass rate controllers.

The operations of the low- and high-pass bit controllers 17 and 18 will be explained with reference to the flow chart shown in FIG. 11. First in step S1, the target bit rate for the low-frequency subbands (RL0 to RL4) as in FIG. 10 is set to $T_{low}$, and the target bit rate for all the subbands (RL0 to RL5) is set to $T_{high}$.

Next in step S2, a rate control is made so the total sum of bit rates in all the code blocks existent in the low-frequency subbands (RL0 to RL4) will be less than $T_{low}$. It is assumed that as the result of the rate control, the total sum of bit rates has become $C_{low}$.

Further in step S3, a rate control is made so that the total sum of bit rates in all the block codes existent in the high-frequency subband (RL5) will be less than ($T_{high}$ − $C_{low}$). On the assumption that as the result of this rate control, the total sum of bit rates in all the subbands (RL0 to RL5) has become $C_{high}$, the total sum $C_{high}$ will meet $C_{high} < T_{high}$, so that the bit rate can positively be set to less than the target one.

Thus, the low- and high-pass rate controllers 17 and 18 included in the embodiment of the present invention control the bit rate of the high-frequency subband (RL5) with a priority over the low-frequency subbands (RL0 to RL4), to thereby permitting to maintain or assure the image quality within at least the range of resolution level.

Note that the low- and high-pass rate controllers 17 and 18 add together bit rates for each coding pass or bit plane in a sequence which will be described below. That is, each subband is selected in the order from the most significant bit (MSB) plane to the least significant bit (LSB) plane.

Figure 12:
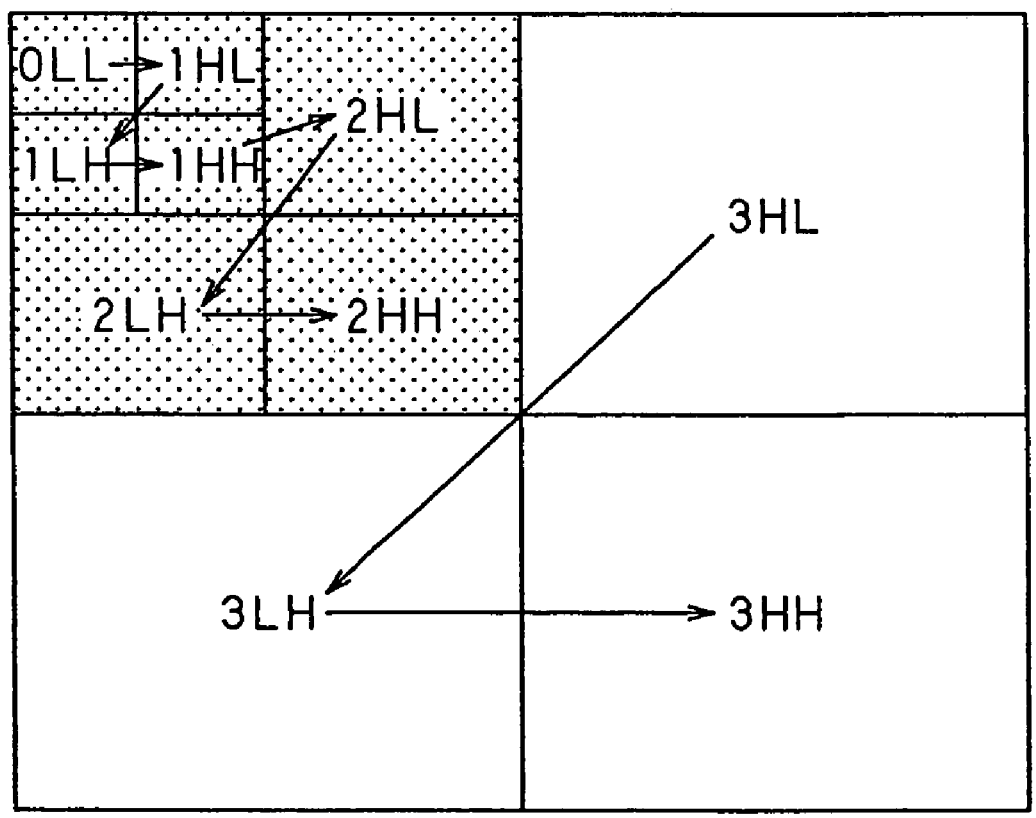
FIG. 12 explains the priority of subbands in the low- and high-pass rate controllers.

Also, bit planes taking the same bit positions in the subbands, respectively, are selected in the order from the lowest-frequency subband to highest-frequency subband. As shown in FIG. 12 for example, in case wavelet transform has been done three times, the low-pass rate controller 17 selects bit planes 0LL, 1HL, 1LH, 1HH, 2HL, 2LH and 2HH in this order, while the high-pass rate controller 18 selects bit planes 3HL, 3LH and 3HH in this order, because important parts of an image are concentrated in low-frequency subbands rather than in high-frequency subbands. It should be noted that of bit planes HL and LH having the same resolution level, LH is given priority, not HL as shown in FIG. 12.

Also, bit planes in the same bit positions in three components Y (brightness), U and V (color difference), respectively, are selected in this order because the human sense of vision is normally more sensitive to the brightness information rather than to the color-difference information. It should be noted that the priority should preferably be varied since the importance level of U and V as equal color-difference information depends upon an input image.

Figure 13:
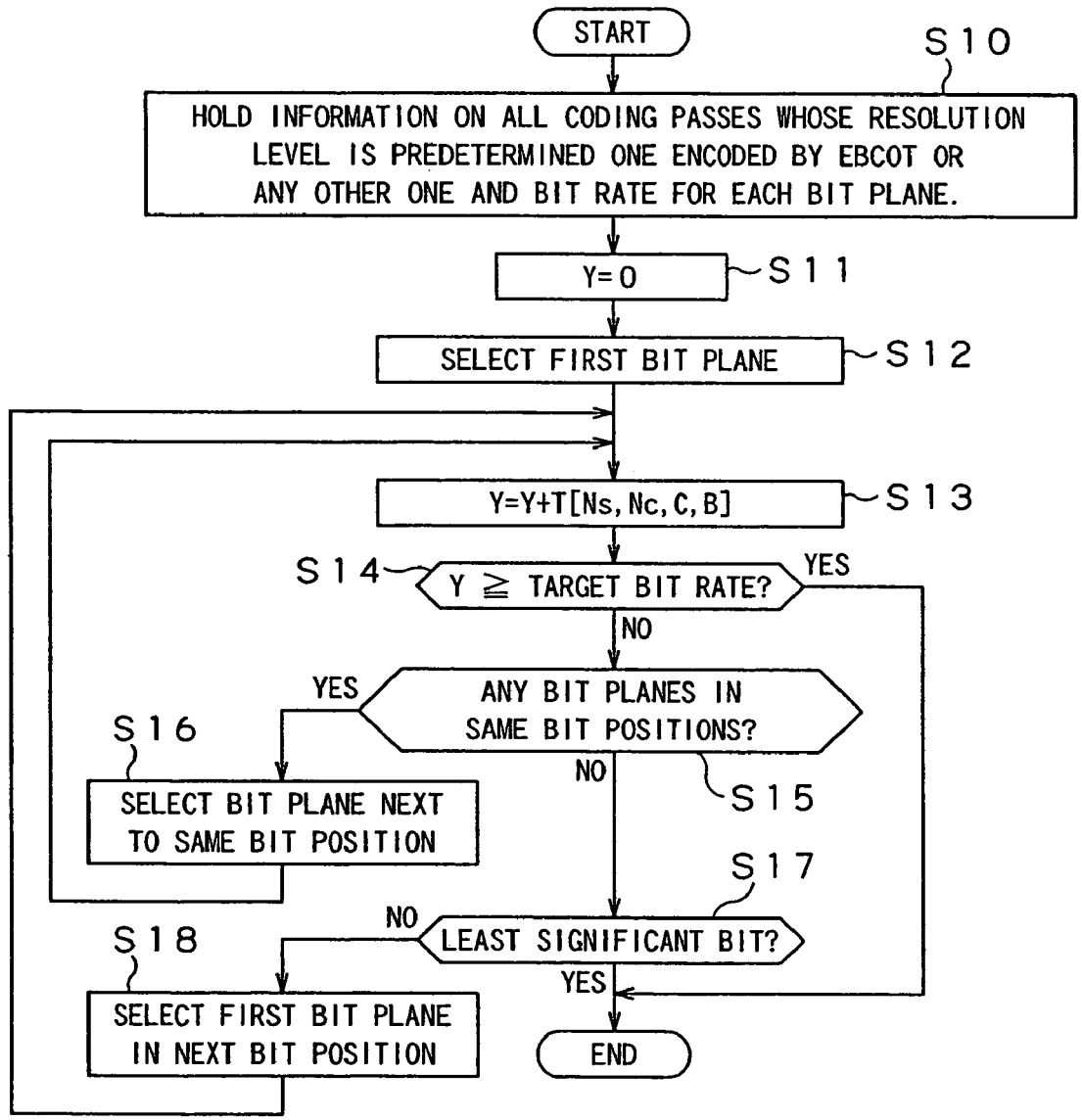
FIG. 13 shows a flow of operations of the low- and high-pass rate controllers, showing the operating procedure in detail.

FIG. 13 shows a flow of operations made in adding the bit planes. First in step S10, there are held information on all the coding passes, encoded by the EBCOT unit 16 and having a predetermined resolution level or other resolution level, and a bit rate for each bit plane.

Next in step S11, a bit rate Y to be added is initialized to 0. Then in step S12, there are selected a bit plane of the most significant bits (MSB) among the first subband, component and code block.

Further in step S13, a bit rate T(Ns, Nc, C, B) for the selected bit plane, where Ns, Nc, C and B indicate a subband number, component number, code block number and bit plane number, is added to the bit rate Y (brightness).

In step S14, it is judged whether the bit rate Y to be added is larger than the target one. If the bit rate Y to be added is determined to be larger than the target one, namely, if the result of judgment is affirmative (YES), the low- and high-pass rate controllers 17 and 18 exit the operation of bit rate addition. On the contrary, if the bit rate Y is smaller than the target one, that is, if the result of judgment is negative (NO), the low- and high-pass rate controllers 16 and 17 go to step S15.

In step S15, it is judged whether bit planes in the same bit positions exist. If there exist bit planes in the same bit positions, namely, if the result of judgment is affirmative (YES), the low- and high-pass rate controllers 17 and 18 go to step S16, select a next bit plan and return to step S13. On the contrary, if there exist no bit planes in the same bit positions, namely, if the result of judgment is negative (NO), the low- and high-pass rate controllers 17 and 18 go to step S17.

In step S17, it is judged whether the bit is LSB. If the bit is determined to be the least significant bit LSB (YES), the low- and high-pass rate controllers 17 and 18 exit the operation of addition. If the result of judgment is negative (NO), the low-and high-pass rate controllers 17 and 18 select the first bit plane in the position of a bit next to the least significant bit (LSB) in step S18, and return to step S13.

Figure 14:
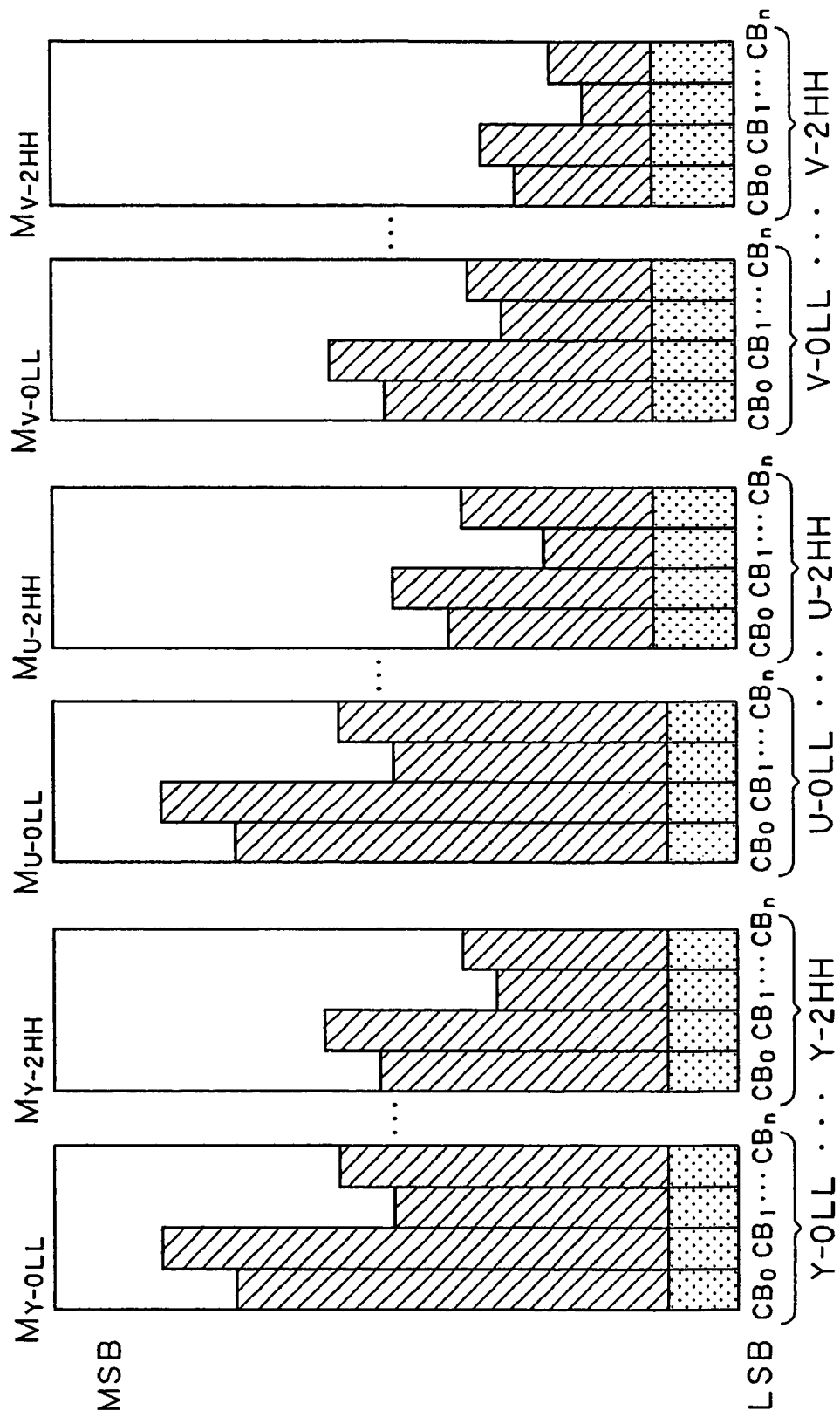
FIG. 14 explains the operations in the low-pass rate controller in detail from the standpoint of the bit plane.

Next, the operations made of the low-pass rate controller 17 will be described in detail from the viewpoint of the bit plane with reference to FIG. 14. FIG. 14 shows a bit plane for each of code blocks (CB) in each subband for three components including Y (brightness), U and V (color difference). In FIG. 14, the blank area indicates a zero bit plane, hatched area indicate a bit plane finally included in an encoded stream of codes, and smudged area indicates a bit plane not used as a result of rate control.

As shown in FIG. 14, the low-pass rate controller 17 selects a bit plane by going through a cod block, subband and component in the order from a bit plane of most significant bit (MSB) to least significant bit (LSB). Namely, the low-pass rate controller 17 selects a bit plane of subbands in the same bit positions in the order from lowest-frequency subband to highest-frequency subband and a bit plane of components in the order of Y, U and V. More specifically, as shown in FIG. 14, the low-pass rate controller selects bit planes in the order of subbands Y-0LL, . . . , Y-2HH, U-0LL, . . . , U-2HH, V-0LL, . . . , V-2HH as shown in FIG. 14, and bit planes in the order of $CB_0$, . . . , $CB_n$ in each subband starting at the most significant bit (MSB). When the total sum of the bit rates in a bit plane has arrived at a predetermined target bit rate, the low-pass rate controller 17 stops the addition.

Note that in this embodiment, bit planes are selected for subbands with priority over components. However, the present invention is not limited to this manner of selection but bit planes may be selected for components more preferentially for subbands.

Similarly, the high-pass rate controller 18 selects bit planes in the order of subbands Y-3HL, . . . , Y-3HH, U-3HL, . . . , U-3HH, V-3HL, . . . , V-3HH, and bit planes are selected in the order of $CB_0$, . . . , $CB_n$ in each subband starting with the most significant bit (MSB).

In the low- and high-pass rate controllers 17 and 18 included in the embodiment of the present invention, the number of bit planes finally truncated, not selected, is only different a maximum of one bit plane counted from the least significant bit (LSB) from all the code blocks in one frame. So, there is no difference in image quality between the subbands and thus an image of totally high quality can be assured.

Figure 15:
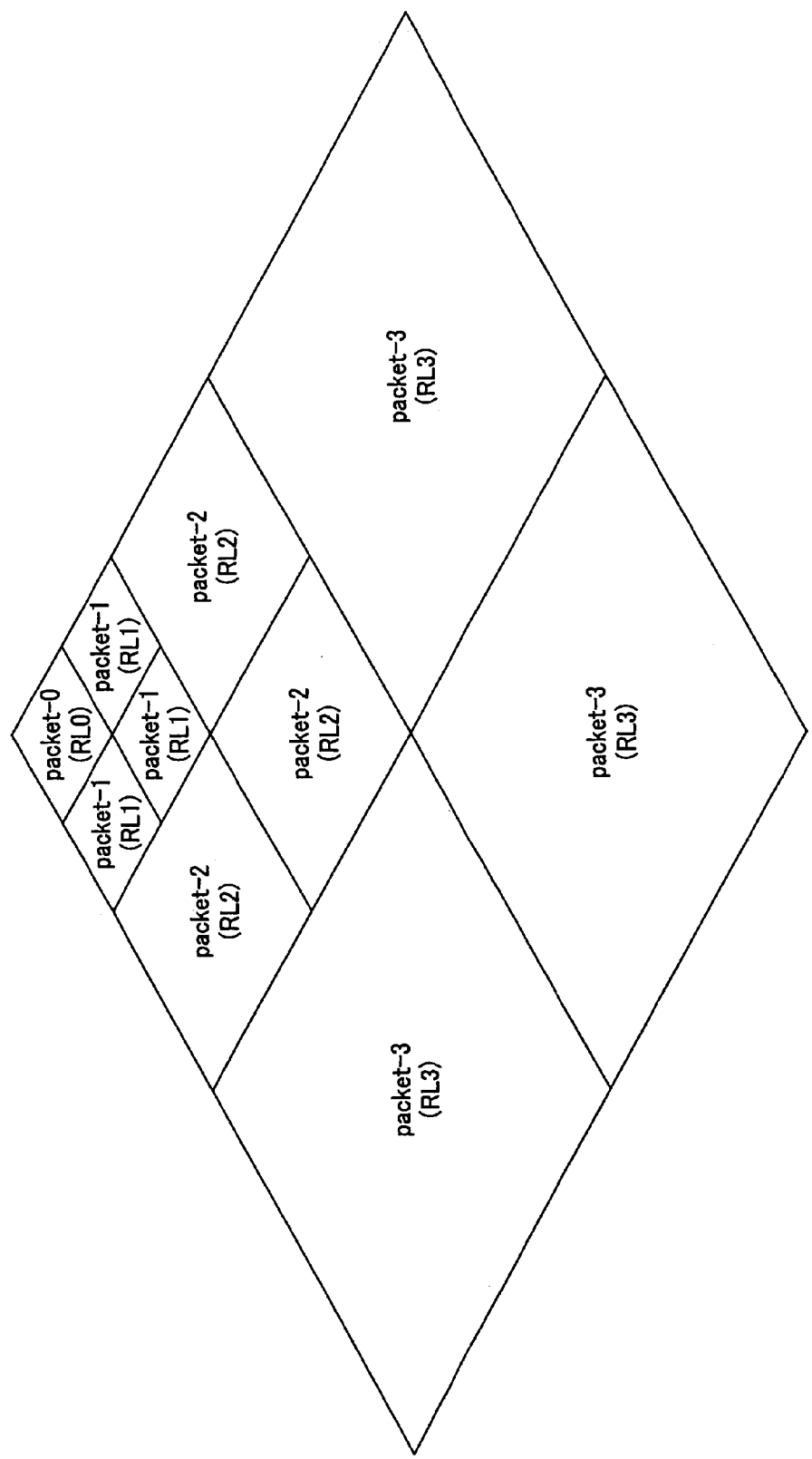
FIG. 15 explains a packet generated by a packet generator in the image encoder as the embodiment of the present invention.

The description will be made with reference to FIG. 1 again. The packet generator 19 adds a header to each of the arithmetic code D18 supplied from the low-pass rate controller 17 and arithmetic code D20 supplied from the high-pass rate controller 18 to form packets, and outputs them as an encoded stream of codes D21. At this time, the packet generator 19 generates individual packets at the same resolution level as shown in FIG. 15. That is, of the packets, a lowest-frequency packet −0 includes only subbands whose resolution level is 0 (RL0), packets −1 include only subbands whose resolution level is 1 (RL1), packets −2 include only subbands whose resolution level is 2 (RL2) and packets −3 include only subbands whose resolution level is 3 (RL3). The packet generator 19 outputs the encoded stream of codes D21 packet by packet.

As having been described in the foregoing, in the image encoder 1 as the embodiment of the present invention, the quantizer 11 can control the quantization to make a quantization-step size for each low-frequency subband whose resolution level belongs to a predetermined resolution level, for example, a low-frequency subband whose resolution level is 1000×500, of an original image whose resolution level is 2000×1000, coincide with a quantization-step size set for each subband to encode an original image whose resolution level is 1000×500, and the low-pass rate controller 17 can control the quality of a compressed image of a low-frequency subband to approximate that of a compressed image resulted from compression of an original image having originally that resolution by controlling the bit rate of a low-frequency subband with priority over the bit rate of a high-frequency subband, and maintain a high quality of the compressed image resulted from compression of the original image.

Also, the low- and high-pass rate controllers 17 and 18 can select bit planes by going through the code block, subband and component in the order from the most significant bit (MSB) to least significant bit (LSB) and add the bit rates for the bit planes for comparison with the target bit rate, and exit the bit-control operation immediately when the target bit rate has been reached. Moreover, since the number of bit planes not finally selected and which are to be truncated is different by a maximum of one bit plane from all the code blocks in one frame even if counted from the least significant bit (LSB), so there is no difference in quality between the subbands and an image having a high quality as a whole can be provided.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

For example, although a special quantization control and rate control are made of low-frequency subbands subjected to wavelet transform once, that is, low-frequency subbands (RL0 to RL4) in FIG. 10, in the aforementioned embodiment, the present invention is not limited to this embodiment but quantization control and rate control may of course be made of low-frequency subbands (RL0 to RL3) subjected to wavelet transform twice, low-frequency subbands (RL0 to RL2) subjected to wavelet transform three times, or the like.

What is claimed is:

1. An image encoding apparatus comprising:
    a filtering means for filtering an input image to generate a plurality of subbands different in resolution level;
    a quantizing means for quantizing each coefficient of the filtered input image by dividing it by a quantization-step size set for each of the subbands;
    a code block generating code blocks each having a predetermined size by dividing the subband;
    a bit plane generating means for generating a bit plane including bits from an MSB to an LSB for each of the code blocks;
    an encoding means for making arithmetic coding of the coding pass generated for each of the bit planes; and
    a means for generating an encoded stream of codes by forming a packet from the arithmetic code generated by the encoding means,
    the quantizing means making the quantization-step size set for the subband whose resolution level belongs to a predetermined resolution level coincide with the quantization-step size set for each subband to quantize the predetermined resolution level as that of an original image.

2. The apparatus according to claim 1, further comprising:
a first bit rate controlling means for controlling, based on the arithmetic code generated by the encoding means, the bit rate for assignment to all the code blocks whose resolution level belongs to the predetermined resolution level to less than a first bit rate; and
a second bit rate controlling means for controlling, based on the arithmetic code generated by the encoding means, the bit rate for assignment to all the code blocks whose resolution level belongs to a resolution level other than the predetermined resolution level to less than a second bit rate after the bit rate is controlled by the first bit rate controlling means.

3. The apparatus according to claim 2, wherein the second bit rate is a result of subtraction of the bit rate actually assigned to all the code blocks whose resolution level belongs to the predetermined resolution level from a target bit rate for the entire input image.

4. The apparatus according to claim 2, wherein the first and second bit rate controlling means compare a cumulative bit rate with the first and second bit rates while sequentially adding together the bit rates assigned to the bit planes or coding passes, respectively, in an order from the bit plane of the most significant bit to that of the least significant bit, and stops the addition when the cumulative bit rate exceeds the first and second bit rates.

5. The apparatus according to claim 4, wherein the first and second bit rate controlling means add, for the bit planes in the same bit positions, the bit rates assigned to the bit planes or coding passes, respectively, in the order of the lowest-frequency subband to the highest-frequency subband.

6. The apparatus according to claim 1, wherein the subbands whose resolution level belongs to the predetermined resolution level are low-frequency ones of four subbands generated by making low- and high-pass filtering of the input image once in each of vertical and horizontal directions.

7. An image encoding method comprising the steps of:
filtering an input image to generate a plurality of subbands different in resolution level;
quantizing each coefficient of the filtered input image by dividing it by a quantization-step size set for each of the subbands;
generating code blocks each having a predetermined size by dividing the subband;
generating a bit plane including bits from an MSB to an LSB for each of the code blocks;
making arithmetic coding of the coding pass generated for each of the bit planes; and
generating an encoded stream of codes by forming a packet from the arithmetic code generated by the encoding means,
the quantization-step size set for the subband whose resolution level belongs to a predetermined resolution level being made in the quantizing step to coincide with the quantization-step size set for each subband to quantize the predetermined resolution level as that of an original image.

8. The method according to claim 7, further comprising:
a first bit rate step of controlling, based on the arithmetic code generated in the encoding step, the bit rate for assignment to all the code blocks whose resolution level belongs to the predetermined resolution level to less than a first bit rate; and
a second bit rate controlling step of controlling, based on the arithmetic code generated in the encoding step, the bit rate for assignment to all the code blocks whose resolution level belongs to a resolution level other than the predetermined resolution level to less than a second bit rate after the bit rate is controlled in the first bit rate controlling step.

9. The method according to claim 8, wherein the second bit rate is a result of subtraction of the bit rate actually assigned to all the code blocks whose resolution level belongs to the predetermined resolution level from a target bit rate for the entire input image.

10. The method according to claim 8, wherein in the first and second bit rate controlling steps, a cumulative bit rate is compared with the first and second bit rates while the bit rates assigned to the bit planes or coding passes, respectively, are sequentially added together in an order from the bit plane of the most significant bit to that of the least significant bit, and the addition is stopped when the cumulative bit rate exceeds the first and second bit rates.

11. The method according to claim 10, wherein in the first and second bit rate controlling steps, the bit rates assigned to the bit planes or coding passes, respectively, are added, for the bit planes in the same bit positions, in the order of the lowest-frequency subband to the highest-frequency subband.

12. The method according to claim 7, wherein the subbands whose resolution level belongs to the predetermined resolution level are low-frequency ones of four subbands generated by making low- and high-pass filtering of the input image once in each of vertical and horizontal directions.

* * * * *